(12) United States Patent
Lyle

(10) Patent No.: US 7,454,812 B1
(45) Date of Patent: Nov. 25, 2008

(54) TUBE CLEANING TOOL

(76) Inventor: Daniel C. Lyle, R.D. 6, Box 300, Kittaning, PA (US) 16201

( * ) Notice: Subject to any disclaimer, the term of this patent is extended or adjusted under 35 U.S.C. 154(b) by 168 days.

(21) Appl. No.: 10/273,944

(22) Filed: Oct. 18, 2002

(51) Int. Cl.
*B08B 1/00* (2006.01)
(52) U.S. Cl. .............................. 15/104.05; 15/104.061
(58) Field of Classification Search ............. 15/104.03, 15/104.05, 104.061, 104.062, 104.16, 3.5, 15/3.51, 104.17; *B08B 1/00, 7/00, 9/00*
See application file for complete search history.

(56) References Cited

U.S. PATENT DOCUMENTS

| | | | |
|---|---|---|---|
| 576,425 A | 2/1897 | Bilton et al. | |
| 1,122,246 A | 12/1914 | Beam | |
| 1,612,842 A * | 1/1927 | Thompson et al. | 15/104.18 |
| 1,732,277 A | 10/1929 | Owens | |
| 2,026,680 A | 1/1936 | Jacobson | |
| 2,170,997 A | 8/1939 | Griffin | |
| 2,402,796 A | 6/1946 | Wood | |
| 2,636,202 A | 4/1953 | Hinzman | |
| 2,640,213 A * | 6/1953 | Robinson | 15/104.061 |
| 2,734,208 A | 2/1956 | Griffin | |
| 3,480,984 A | 12/1969 | Kidd | |
| 3,939,519 A | 2/1976 | Muirhead | |
| 4,069,535 A | 1/1978 | Cato | |
| 4,178,649 A * | 12/1979 | Kouse et al. | 15/104.061 |
| 4,281,432 A | 8/1981 | Saxon | |
| 4,413,370 A | 11/1983 | Payne et al. | |
| 4,509,222 A | 4/1985 | Knapp | |
| 4,891,115 A | 1/1990 | Shishkin et al. | |
| 5,153,963 A * | 10/1992 | Saxon et al. | 15/104.061 |
| 5,305,488 A * | 4/1994 | Lyle | 15/104.061 |

(Continued)

FOREIGN PATENT DOCUMENTS

GB 2207973 A 2/1989

OTHER PUBLICATIONS

Brochure distributed by Conco Systems, Inc., "patented water powered tube cleaning tools", pp. 1-12, copyright 1987.

*Primary Examiner*—David A Redding
(74) *Attorney, Agent, or Firm*—Andrew J. Cornelius

(57) ABSTRACT

A cleaning device, or projectile, cleans the inside surface of a tube as it is propelled by a liquid through the tube by mechanically scraping and cleaning soft and hard deposits, such as sludge and manganese, from the inner surface of the tube, such as those found in condensers and heat exchangers. The tube cleaning device, or projectile, is propelled forward by a high-pressure fluid spray injected into a tube. This high-pressured fluid injection is sufficient to advance the device through the tube, allowing the device to scrape or otherwise dislodge incrustations or other accumulations from the interior wall of the tube. The tool cleans the inside surface of a tube as the tool travels through the tube and includes a compressible bushing and a series of cutters secured to a split support that defines a cavity for receiving the bushing, the support being adapted to be opened and closed to receive and contain the bushing. Each cutter defines a cutting surface of a diameter that depends on the diameter and hardness of the bushing. Use of bushings with various diameters and hardness provides effective cutting surfaces of various diameters and scraping forces of various magnitudes. Each cutter can define a mounting groove to receive a metal cutter for tougher deposits.

6 Claims, 5 Drawing Sheets

U.S. PATENT DOCUMENTS 5,528,790 A 6/1996 Curran
5,960,505 A 10/1999 Sanghoon et al.
5,966,768 A 10/1999 Hahn
6,085,376 A 7/2000 Antal et al.

* cited by examiner

TUBE CLEANING TOOL

BACKGROUND OF THE INVENTION

The present invention relates to a cleaning tool for the loosening and removal of deposits from the interior wall of tubes.

It is well known that fluid driven projectiles or scrapers can be used for the removal of mud, slim, scale or other deposits from the interior wall of a tube, such as a condenser, heat exchanger or similar tubing. Such scrapers generally comprise one or more cutters or scrapers that extend outwardly from a support. One type of device has a cutter that contains two blades that contact the inside of the tube. Generally, the tail portion of the projectile will contain a section which will enable the projectile to be forced through the tubing by the use of fluid and will also allow for some fluid to pass through the projectile device, cleaning debris from in front of the projectile as the projectile moves through the tube. There are some difficulties with this arrangement, a few of which are the limited contact that a cutter blade has with the inner wall of the tube and the lack of ability to control the pressure exerted by the cutter blades on the inside wall of the tube. Examples of non-adjustable tube cleaning tools are described in U.S. Pat. Nos. 2,170,997, 2,734,208, and 4,281,432.

U.S. Pat. No. 5,305,488 ("488") shows an adjustable tool that is effective. Because the device shown in 488 is adjustable, its blades have a much greater percentage of contact with the inner wall of the tube, which will allow a greater percentage of deposits to be scraped away and cleaned from the inner wall of the tube for each pass of the projectile through the tube. However, the construction of this tool is relatively complex, and is fabricated from relatively expensive materials. As a consequence, one-piece molded plastic tools have been marketed. These plastic tools are not as effective as the type of tool shown in 488, but they are adequate for certain applications where maximum cleaning is not necessary or desired. A typical one-piece plastic tool is shown in FIGS. 1, 2 and 3. The tool shown in FIGS. 1, 2 and 3 is not, however, adjustable and, consequently, has the shortcomings of other types of tube cleaning tools that are not adjustable.

The present invention is designed to overcome these difficulties by providing an adjustable projectile of simple construction that is less costly than the type of adjustable projectile shown in 488. In instances where a non-adjustable, all-plastic projectile of the type shown in FIGS. 1, 2 and 3 would normally be used, use of the present invention will provide a projectile that will clean the tube more thoroughly on each pass of the projectile through the tube, thereby requiring fewer passes to completely clean the tube, since the force that the cutters of the projectile will exert on the inner surface of the tube is adjustable, which will enable the invention to be used on both hard and soft deposits on the interior wall of the tube, regardless of tube diameter.

SUMMARY OF THE INVENTION

The present invention relates to the mechanical scraping and cleaning of soft and hard deposits, such as sludge and manganese, from the inner surface of a tube, such as those found in condensers and heat exchangers. The present invention provides a device for the scraping and cleaning of the inside wall of the tube. This tube cleaning device, or projectile, is propelled forward by a high-pressure fluid spray injected into a tube. This high-pressured fluid injection is sufficient to advance the device through the tube, allowing the device to scrape or otherwise dislodge incrustations or other accumulations from the interior wall of the tube.

The tool cleans the inside surface of a tube as the tool travels through the tube, and includes a compressible bushing and at least one cutter secured to a support that defines a cavity for receiving the bushing. The support is adapted to be opened and closed to receive and contain the bushing. The at least one cutter defines a cutting surface having an effective diameter that can be adjusted by inserting into the cavity a bushing of a diameter and hardness that establishes the desired force that the cutter will exert against the interior surface of the tube through which the tool is propelled. Thus, the scraping force of the cutter as it travels through the tube is adjusted by choosing a bushing of an appropriate diameter and hardness.

DESCRIPTION OF THE DRAWINGS

The following description of the preferred embodiments may be understood better if reference is made to the appended drawing, in which.

DETAILED DESCRIPTION OF THE PREFERRED EMBODIMENT

While preferred embodiments of the present invention have been illustrated and described herein, it is to be understood that various changes may be made therein without departing from the spirit of the invention, as defined by the scope of the appended claims.

Figure 1:
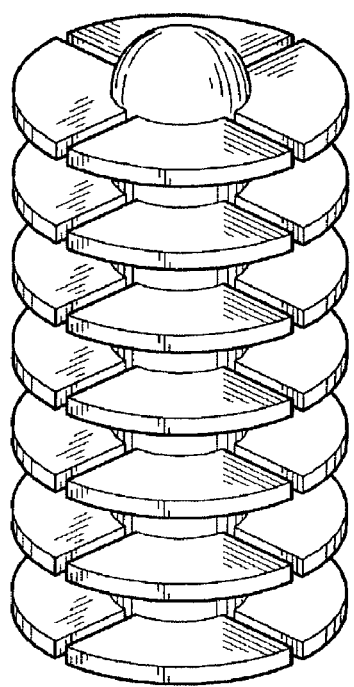
FIG. 1 is a perspective view of a prior art tube cleaner or projectile.
Figure 2:
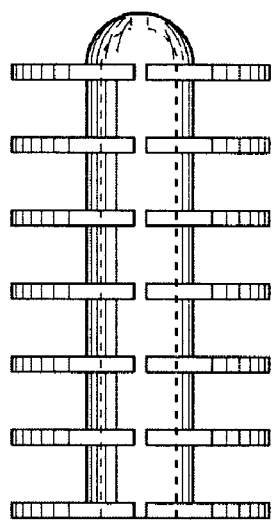
FIG. 2 is a side elevation view of the prior art tube cleaner or projectile shown in FIG. 1.
Figure 3:
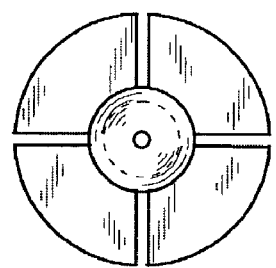
FIG. 3 is a top plan view of the prior art tube cleaner or projectile shown in FIG. 1.
Figure 5:
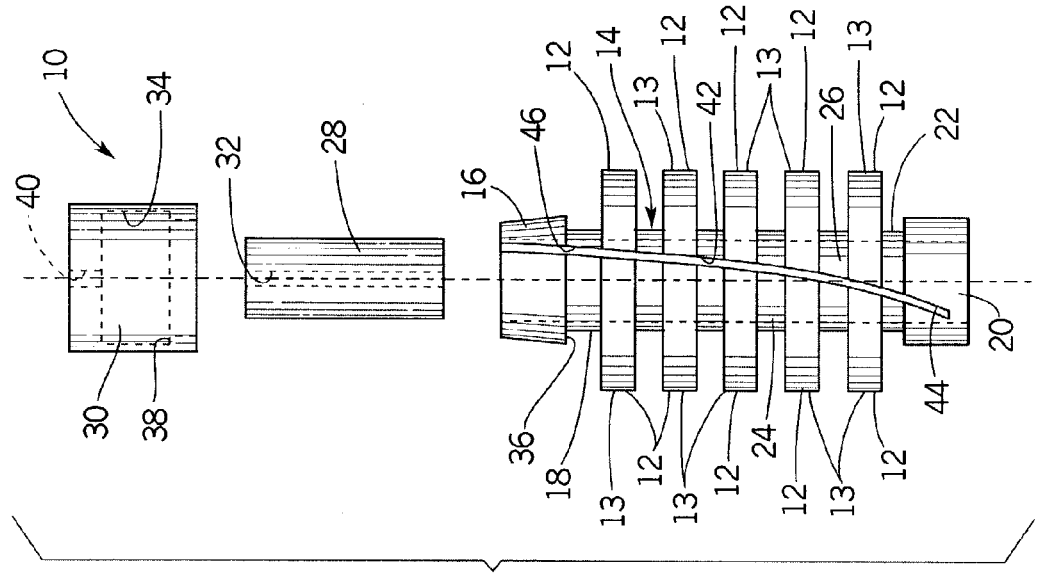
FIG. 5 is an exploded, side view of the projectile shown in FIG. 4.
Figure 4:
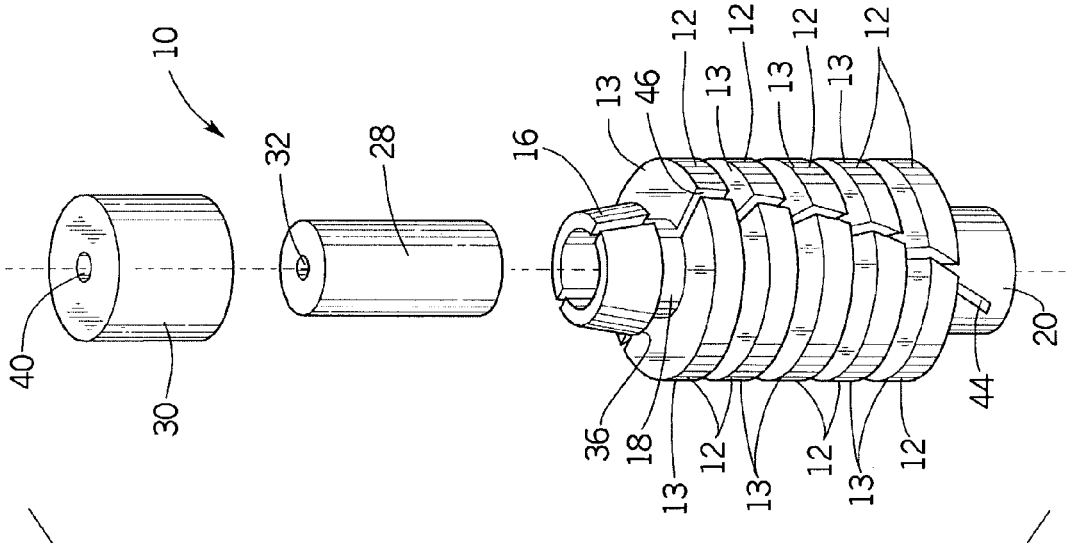
FIG. 4 is an exploded, perspective view of a tube cleaner or projectile provided by the present invention.
Figure 7:
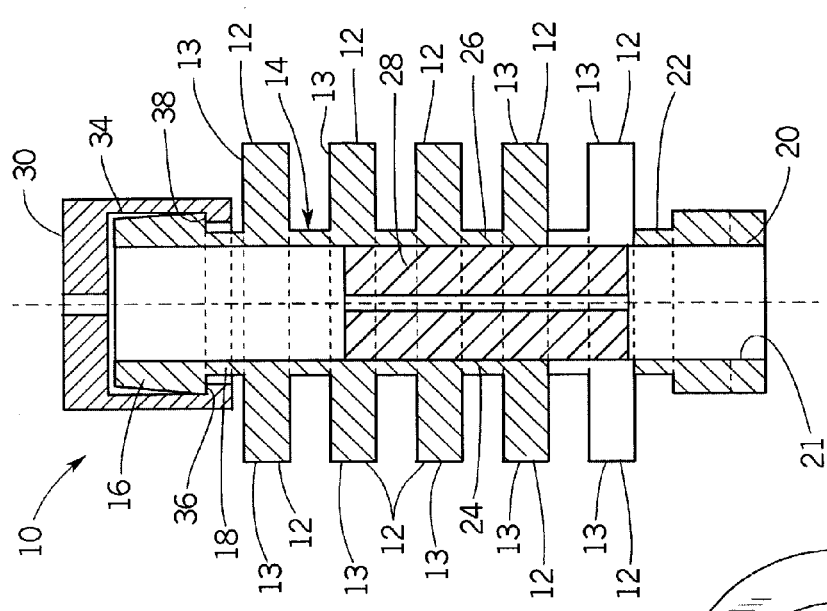
FIG. 7 is a side sectional view of the projectile shown in FIG. 6, taken along the line VII-VII.
Figure 8:
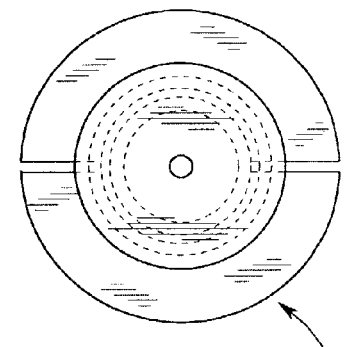
FIG. 8 is a top plan view of the projectile shown in FIG. 6.
Figure 6:
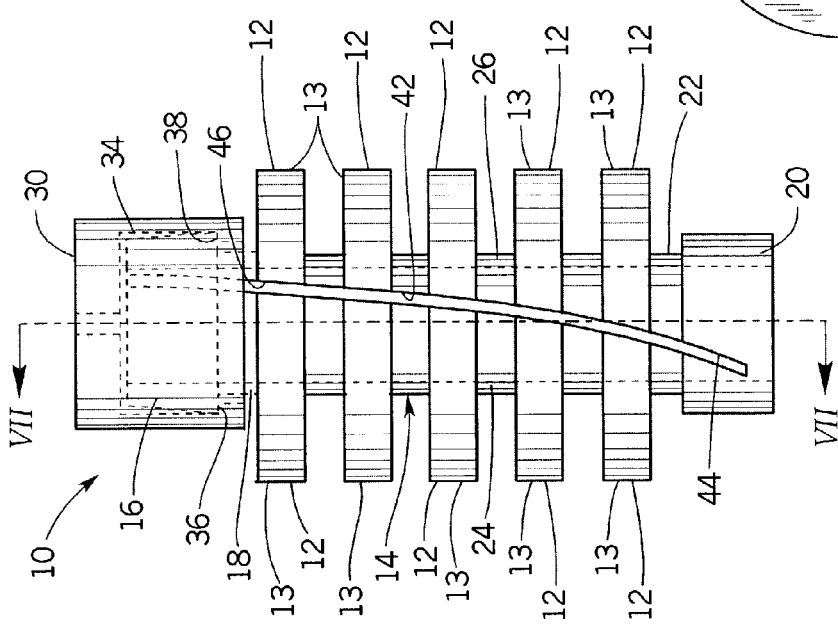
FIG. 6 is a side view of the projectile shown in FIGS. 4 and 5.

FIGS. 4 through 8 show a tube cleaner or projectile 10 that is a preferred embodiment provided by the present invention. Preferably, cleaner 10 is one piece of molded somewhat flexible plastic, preferably a suitable wear-resistant polymer. Cleaner 10 includes a series of cutters or scrapers 12 that are formed on the outer surface of a hollow, split cutter support 14. Each cutter 12 defines two or more cutter sections 13 that form a generally circular cutting surface that conforms to the inner surface of the tube through which cleaner 10 is propelled to clean the inner surface of the tube. A split tail portion 16 is formed on end 18 of support 14. Although tail portion 16 may be split to form two or more sections, two sections are preferable. Similarly, a nosepiece 20 is formed on end 22 of support 14. Nosepiece 20 defines a passage 21 that allows passage of the propelling fluid through nosepiece 20.

Support 14 is split into two or more sections to permit support 14 to be separated and a cylindrical central rubber bushing 28 to be inserted into support 14. Bushing 28 is flexible and compressible. The number of cutter sections 13 for each cutter 12 should be the same as the number of sections into which support 14 is split. Preferably, cutter support 14 is split into two sections 24 and 26, and each cutter 12 is formed by a pair of cutter sections 13. Bushing 28 defines a central longitudinal passage 32 through which can pass the liquid that is used to propel cleaner 10 through a tube. Nosepiece 20 is partially split to provide a hinge connection at nosepiece 20 about which support sections 24 and 26 can be partially rotated relative to each other to open and close support 14 to insert bushing 28 into and withdraw bushing 28 from support 14. The diameter and hardness of bushing 28 determines the extent of separation of sections 24 and 26, which determines the separation from each other of the cutter sections 13 on section 24 and section 26 and, therefore, the diameter of the effective cutting surfaces of cutters 12. The greater the degree of separation of sections 24 and 26 from each other, the greater the effective diameter of cutters 12 and the more force will be applied by cutters 12 to the inner surface of the tube through which cleaner 10 is propelled to clean the tube. Thus, the diameter and hardness of bushing 28 is chosen to allow cutters 12 to apply the desired magnitude of force against the inner surface of the tube.

A cap 30 is employed to hold the sections of split tail portion 16 together after a suitable bushing 28 has been inserted within support 14. When cap 30 is in place, bushing 28 is compressed somewhat. Typically, cap 30 will not compress bushing 28 to the extent that the edges of sections 24 and 26 will touch each other. Accordingly, the degree to which cap 30 compresses bushing 28 must be taken into account when determining the diameter and hardness of bushing 28 that will provide the desired scraping force.

Cap 30 defines a cavity 34 that is adapted to receive and lock onto tail portion 16. When cap 30 is forced onto tail portion 16 sufficiently, peripheral edge 36 of tail portion 16 becomes engaged with circumferential ledge 38 defined by the interior surface of cap 30 to hold cap 30 in place. Cap 30 defines a passage 40 that allows some of the liquid that propels cleaner 10 through the tube to enter support 14 and pass through passage 32 of bushing 28 to allow some of the propelling liquid to pass through tool 10 and pass through the tube in advance of tool 10 to soften the tube deposits and make them easier for tool 10 to scrape.

The cutter sections 13 and the support sections forming support 14 form two or more grooves 42. As cleaner 10 is propelled through a tube, that part of the tube over which grooves 42 pass are not cleaned. Therefore, if the gaps in cutters 12 are so arranged that grooves 42 are aligned with the longitudinal axis of cleaner 10, that is, if the gaps are aligned longitudinally, two narrow longitudinal strips, corresponding to the passage of grooves 42 through the tube, will not be cleaned properly. This may be acceptable in some applications, and grooves 42 can be so arranged. However, the gaps in cutters 12 of cleaner 10 are misaligned longitudinally. That is, the gaps are arranged to provide grooves 42 that are not parallel with the longitudinal axis of cleaner 10. Although other angular separations are acceptable, the starting point 44 and ending point 46 of each groove 42 of cleaner 10 are separated from each other angularly by about 45°. Therefore, the parts of the inner surface of the tube that are missed by a cutter 12 due to the gaps between its sections, those missed surfaces will be cleaned by the cutting edges of the remaining cutters 12, the gaps of which are in different angular positions.

In using tool 10 to clean the inside surface of a tube, sections 24 and 26 of support 14 are separated from each other to the extent necessary to allow insertion of a bushing 28 within support 14 that provides the combination of diameter and hardness that will allow tool 10 to achieve the desired cutting force. The bushing 28 of the desired diameter or hardness is inserted within support 14, sections 24 and 26 are squeezed together, and cap 30 is inserted on tail portion 16. Tool 10 is then ready to be propelled through the tube. As is common in the trade, a number of tools 10 are propelled through the tube to clean it.

Figure 10:
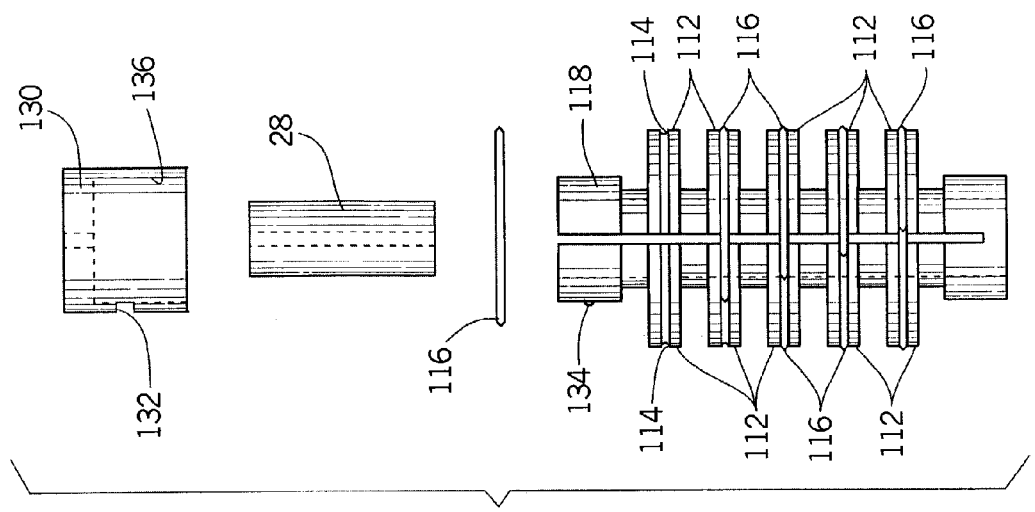
FIG. 10 is an exploded, side view of the projectile shown in FIG. 9.
Figure 9:
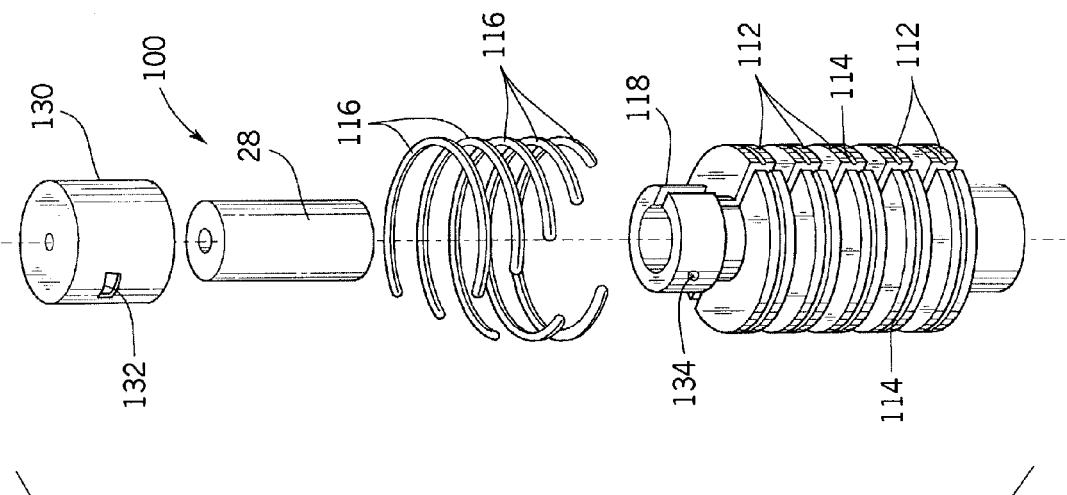
FIG. 9 is an exploded, perspective view of another tube cleaner or projectile provided by the present invention.
Figure 12:
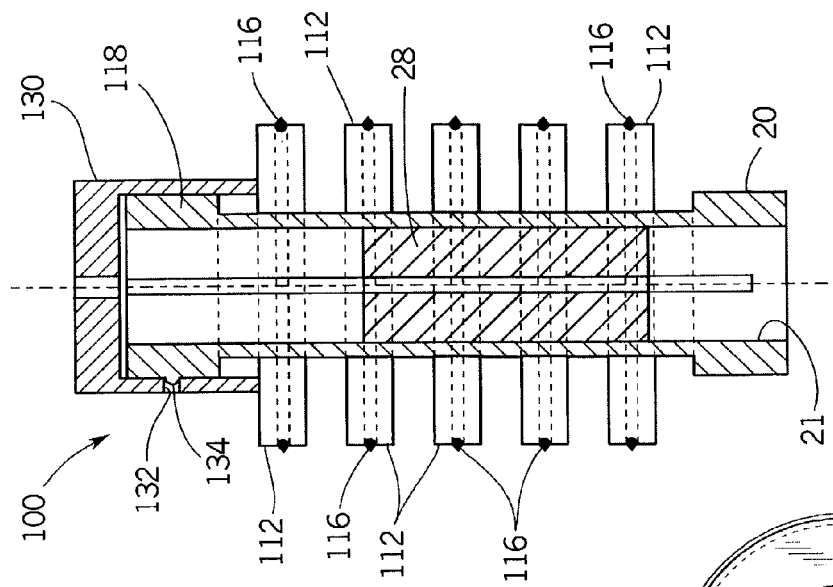
FIG. 12 is a side, sectional view of the projectile shown in FIG. 11, taken along the line XII-XII.
Figure 13:
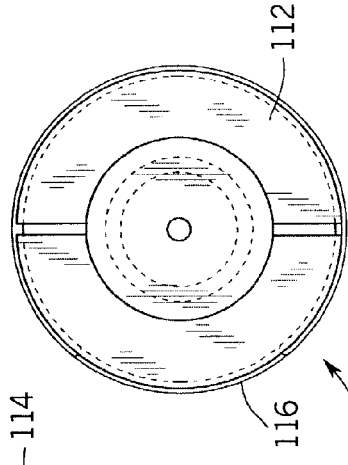
FIG. 13 is a top plan view of the projectile shown in FIG. 11.
Figure 11:
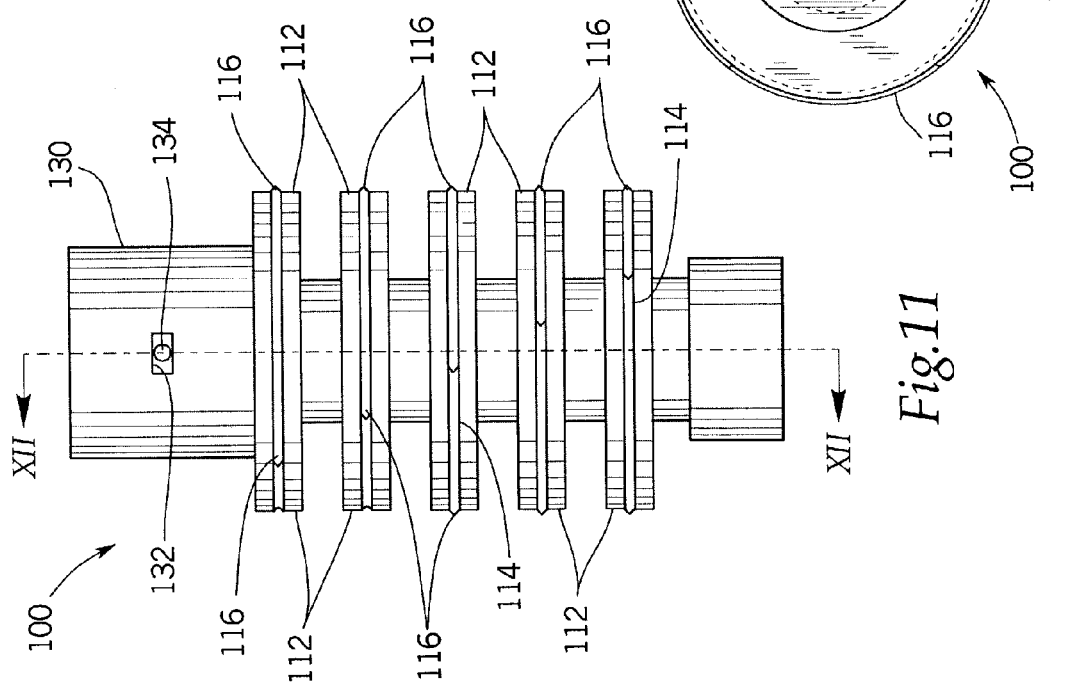
FIG. 11 is a side view of the projectile shown in FIG. 9.

Grooves of the type formed in cutters 112 of cleaner 100 (see FIGS. 9 through 13) can be formed in cutter sections 13 to receive a cutter 116 of the type used with cleaner 100. As with cleaner 100, the gaps of each cutter 116 should be staggered to ensure that the entire interior surface of the tube through which the cutter 10 is traveling will be engaged by the cutting surface of at least one, and preferably more, cutter 12. Cutters 116 should be mounted on cutters 12 after the bushing 28 is mounted within support 14, since it will be difficult, if not impossible, to separate support 14 with cutters 116 mounted in place.

FIGS. 9 through 13 show another cleaning projectile or tool 100 provided by the present invention. Cleaner 100 can be used in applications where a harder cutter is desired. Cleaner 100 is identical to cleaner 10, with the following exceptions. One or more of the cutters 112 defines a groove 114 that is adapted to retain a metal cutter 116. Each metal cutter 116 preferably is fabricated from any metal that is suitable, given the material from which the tube is made and the type of deposits that are expected to be present in the tube. The cutting edge of each cutter 116 extends slightly beyond the edge of each cutter 112 to enable cutters 116 to engage the tube wall as cleaner 100 travels through the tube. Each cutter 116 defines a gap that encompasses approximately one third of the circumference of the cutter 116. The gaps of cutters 116 should be staggered to ensure that the entire interior surface of the tube through which the cleaner 100 is traveling will be engaged by the cutting surface of at least one, and preferably more, cutter 112. Cutters 116 should be mounted on cutters 112 after the bushing 28 is mounted in place, since it will be difficult, if not impossible, to separate the sections of cleaner 100 with cutters 116 mounted in place.

Additionally, cap 130 and tail portion 118 of cleaner 100 have a configuration that is different from those of cleaner 10. Cap 130 defines two or four slots 132, preferably four, each of which fits over and is retained by crown 134 when cap 130 is in place on tail portion 118. Cap 130 defines a receptacle 136 that is adapted to receive tail portion 118. As cap 130 is forced over tail portion 118 with each slot 132 aligned radially with a crown 134, each crown 134 will lodge within a slot 132, thereby locking cap 130 in place.

Additional changes may be made to the design of the invention. These variations should not be considered as a departure from the subject invention.

What is claimed is:

1. A tool for cleaning the inside surface of a tube as said tool travels through the tube comprising a compressible bushing and at least one cutter secured to a support that defines a cavity for receiving at least part of said bushing, said support being adapted to be opened and closed to receive and contain at least part of said bushing, said at least one cutter defining a cutting surface of a diameter that depends on the diameter and hardness of the said at least part of said bushing located within said cavity, and a cap for maintaining said support in its closed position to hold said at least part of said bushing located within said cavity, said cutters defining gaps that are aligned with each other longitudinally.

2. A tool for cleaning the inside surface of a tube as said tool travels through the tube comprising a compressible bushing and at least one cutter secured to a support that defines a cavity for receiving said bushing, said support being adapted to be opened and closed to receive and contain said bushing, said at least one cutter defining a cutting surface of a diameter that depends on the diameter and hardness of the said bushing located within said cavity, said at least one cutter and said support being formed as a single piece, wherein each said cutter defines a mounting groove to receive a metal cutter.

3. The tool recited by claim 2 wherein said tool further includes at least one cutter mounted within a said groove.

4. A tool for cleaning the inside surface of a tube as said tool travels through the tube comprising a compressible bushing and at least one cutter secured to a support that defines a cavity for receiving at least part of said bushing, said support being adapted to be opened and closed to receive and contain at least part of said bushing, said at least one cutter defining a cutting surface of a diameter that depends on the diameter and hardness of the said at least part of said bushing located within said cavity, and a cap for maintaining said support in its closed position to hold said at least part of said bushing located within said cavity, each said cutter defining a mounting groove to receive a metal cutter.

5. The tool recited by claim 4 wherein said tool further includes at least one cutter mounted within a said groove.

6. A tool for cleaning the inside surface of a tube as said tool travels through the tube comprising a compressible bushing and at least one cutter secured to a single support that defines a cavity, said support being adapted to be opened and closed to assume an open position in which said cavity can receive at least part of said bushing, and a closed position in which said at least part of said bushing can be contained within said cavity, said support being configured to receive a cap for maintaining said support in its closed position to hold said at least part of said bushing within said cavity, said at least one cutter defining a cutting surface of a diameter that depends on the diameter and hardness of the said at least part of said bushing located within said cavity, said at least one cutter and said support being formed as a single piece, and a cap for maintaining said support in its closed position to hold said at least part of said bushing within said cavity.

* * * * *